(12) United States Patent
Ream et al.

(10) Patent No.: US 6,193,105 B1
(45) Date of Patent: Feb. 27, 2001

(54) SHELF-STABLE COOKIE DOUGH CONFECTION, PRODUCT, PACKAGING APPARATUS AND PROCESS

(75) Inventors: Ronald L. Ream, Plano; Christine L. Corriveau, Orland Park; Gregory J. Milosch, Oswego; Timothy J. Guydan, Naperville; Michael P. McHale, Aurora; George M. Nichtula, Yorkville, all of IL (US)

(73) Assignee: Wm. Wrigley Jr. Company, Chicago, IL (US)

( * ) Notice: Under 35 U.S.C. 154(b), the term of this patent shall be extended for 0 days.

(21) Appl. No.: 09/314,715

(22) Filed: May 19, 1999

Related U.S. Application Data (60) Provisional application No. 60/086,561, filed on May 21, 1998.

(51) Int. Cl.[7] .................................................. A21C 1/00
(52) U.S. Cl. ............................ 222/55; 222/63; 141/370
(58) Field of Search .................... 222/55, 63; 141/370

(56) References Cited

U.S. PATENT DOCUMENTS 5,731,022 * 3/1998 Cummins .............................. 222/55

OTHER PUBLICATIONS

Alloyd brand Blister Pack Machine 14/18S1216 Carousel Operating Manual, Model 18SC1216; Alloyd Co. Inc. (30 pp.).

Cookie Dough™ Bites. Distributed by Taste of Nature, Inc., Beverly Hills, California. (Color photocopy of product packaging).

Fluid Technology CPC Barrel Pump Model 987489, Series J89L Instructions –Parts List; Graco Inc. (29 pp.).

KALISH brand Kalishtronic –Giant Internal Bottom Shutoff Nozzles –Product Literature. (2 pp.).

Sentry brand Sanitary Pulse Regulator Installation & Operation Instructions (2 pp.).

Tri–Clover® PR Series Positive Rotary Pump by Tri–Clover Inc. Catalog PR–96. (8 pp.).

Pillsbury® Chocolate CHUNK Cookies (color photocopy of product packaging) (1 p.).

Nestle® TOLL HOUSE® Sugar Cookies Dough (color photocopy of product packaging) (1 p.).

\* cited by examiner

*Primary Examiner*—J. Casimer Jacyna
(74) *Attorney, Agent, or Firm*—Brinks Hofer Gilson & Lione

(57) ABSTRACT

An apparatus for metering and dispensing a compressible confection comprises: at least one metering pump having an intake port and a discharge port; at least one internal bottom shutoff nozzle; at least one product line interconnecting the metering pump and the internal bottom shutoff nozzle; and a control mechanism for cyclically operating the at least one metering pump and operating the at least one internal bottom shutoff nozzle in synchronization with the metering pump such that generally constant pressure is maintained between the metering pump and the internal bottom shutoff nozzle.

30 Claims, 8 Drawing Sheets

SHELF-STABLE COOKIE DOUGH CONFECTION, PRODUCT, PACKAGING APPARATUS AND PROCESS

This application claims the benefit of the filing date under 35 U.S.C. §119(e) of U.S. Provisional Application No. 60/086,561, filed May 21, 1998 which is hereby incorporated by reference.

BACKGROUND OF THE INVENTION

The present invention is directed to a shelf-stable cookie dough confection, a product comprising the shelf-stable cookie dough confection packaged in a sanitary package, an apparatus for metering and dispensing a compressible confection, and a process for packaging the compressible confection.

Traditionally, raw cookie dough was merely the intermediate product of the desired product, the baked cookie. Cookies were either made at home, or were baked and packaged for distribution. In recent years, raw cookie dough has been packaged and distributed as such, to be formed into cookies and baked at home. The cookie itself has somewhat bowed in popularity to the rich, sweet and creamy texture of conventional raw cookie dough. Conventional raw cookie dough and products containing raw cookie dough, such as cookie dough ice-cream, have become increasingly popular. Typically, these products include real eggs and flour. To decrease the danger in eating these products, egg substitutes often replace eggs. However, even with the omission of real eggs, a danger remains under moist conditions as the flour and the proteins therein provide a harbor for bacteria. To prevent microbial growth, conventional raw cookie dough and products containing raw cookie dough require refrigeration and, as such, are not shelf-stable. A shelf-stable cookie dough would therefore be of great importance.

Conventional raw cookie-dough has traditionally been packaged in what is known in the art as a chub-pack. The chub-pack, typically, comprises a thin plastic casing in the form of a tube encasing the cookie dough. Each end of the plastic casing is clinched with a metal band. Despite the bands, when not refrigerated the fat in the product can wick out of the clinched ends, resulting in exposure to air, moisture and contamination. A shelf-stable cookie dough product comprising a shelf-stable cookie dough confection packaged in a sanitary package would therefore be a great improvement.

Once a shelf-stable cookie dough confection was invented in accordance with the present invention, it was found to be compressible. In packaging processes, a compressible confection exhibits compression and relaxation phenomena. More specifically, the compression and relaxation phenomena occur when a compressible confection is initially forced to move through a process line. For example, because air cells are incorporated in an aerated fat used in the confection, the material initially does not move when pressure is applied. In fact, movement only occurs once the confection builds up a head pressure sufficient to overcome the flexing, or compressing, air cells. This is known as the compression phenomenon. Once the confection is moving, the majority of the pressure is stored in the furthest back portion of the confection in the line where pressure originated. Upon relieving the pressure to stop the flow, the partially compressed confection returns to its original form and the confection springs forward to equalize the pressure. This is known as the relaxation phenomenon. Thus, if the product is packaged using an intermittent flow system and a finite number of units per minute to fill the packaged product, the confection will not fill on immediate command due to the compression phenomenon, nor will the flow of the confection shut off on immediate command due to the relaxation phenomenon. These phenomena lead to inconsistent flow, or weight control, of the compressible confection in the final packaged product. Thus, a compressible confection requires unconventional pumping equipment for even flow, or weight control, of the final product. An apparatus and process for metering and dispensing a compressible confection capable of overcoming the compression and relaxation phenomena would be a significant contribution to the art of confection packaging.

SUMMARY OF THE INVENTION

As noted above, a confection has been invented which has a taste and texture of raw cookie dough, but which is shelf-stable. In one aspect, the present invention is such a shelf-stable confection itself In another aspect, the invention is a product comprising a shelf-stable confection having the taste and texture of raw cookie dough in a package, preferably a sanitary package of an individual portion of the confection.

In yet another aspect, the invention is an apparatus for metering and dispensing a compressible confection comprising at least one metering pump, the metering pump comprising an intake port and a discharge port, at least one internal bottom shutoff nozzle, at least one product line interconnecting the metering pump and the internal bottom shutoff nozzle, and a control mechanism for cyclically operating the at least one metering pump and operating the at least one internal bottom shutoff nozzle in synchronization with the metering pump such that generally constant pressure is maintained between the metering pump and the internal bottom shutoff nozzle.

In a further aspect, the invention is a process for packaging a shelf-stable confection having the taste and texture of raw cookie dough comprising the steps of loading at least one empty cup onto a packaging conveyor, conveying the at least one empty cup to a filling station, filling the at least one empty cup with the confection to form at least one filled cup, conveying the filled cup to a lid placement station, placing a lid on top of the filled cup, conveying the filled cup to a lid sealing station, and sealing the lid to the filled cup to form a packaged product.

The shelf-stable cookie dough confection itself confers an improvement over the prior art in that it requires no refrigeration. In addition, the shelf-stable cookie dough product satisfies a need unmet by the prior art for a sanitary package containing a shelf-stable cookie dough confection that protects the confection from exposure to air, moisture and contamination at room temperature. Yet another improvement over the prior art conferred by the present invention is an apparatus and process for metering and dispensing a compressible confection which is capable of overcoming the compression and relaxation phenomena exhibited in conventional processes for packaging compressible confections. These and other advantages of the invention, as well as the invention itself, will be best understood in view of the attached drawings.

DETAILED DESCRIPTION OF THE PREFERRED EMBODIMENTS

Figure 1:
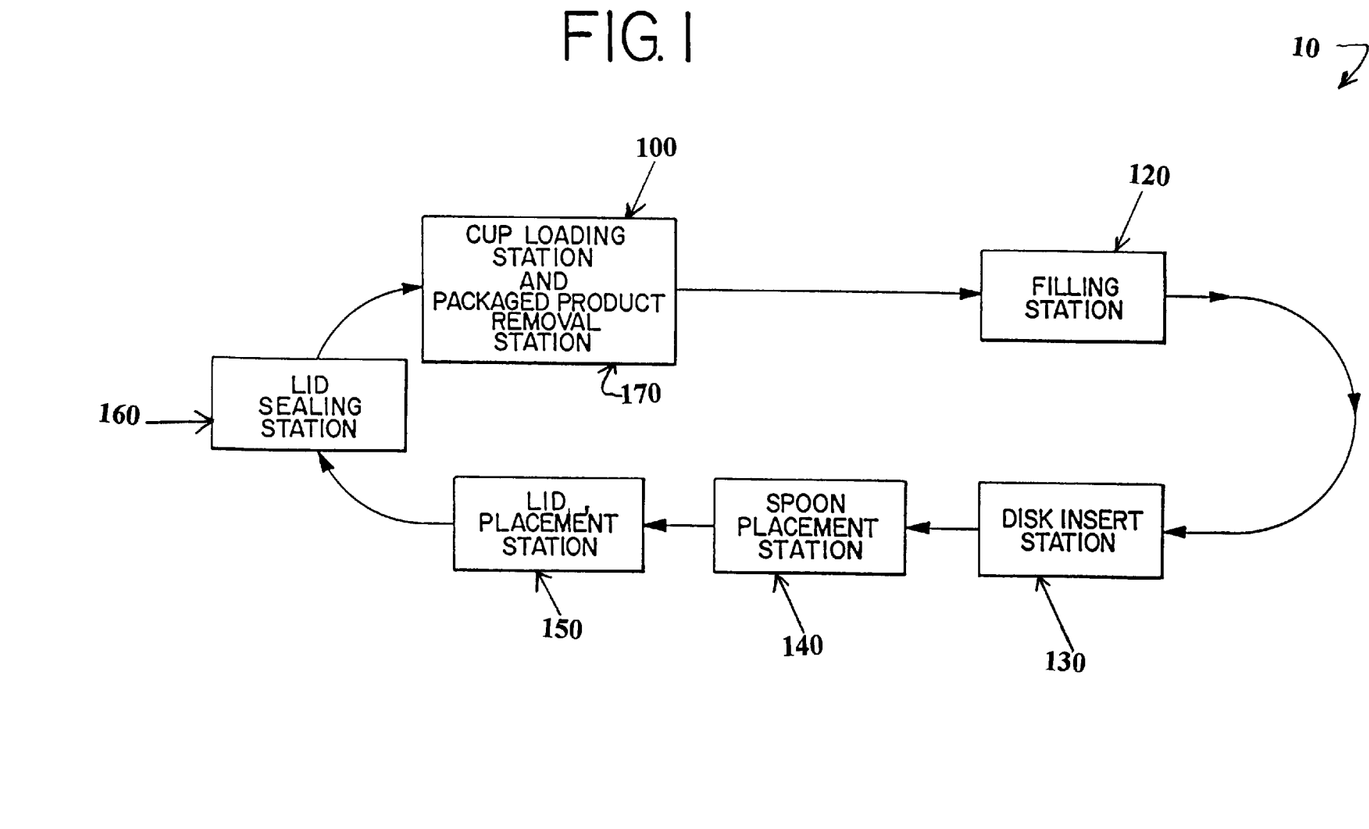
FIG. 1 is a block diagram of the process of packaging the shelf-stable cookie dough confection of the present invention.
Figure 2:
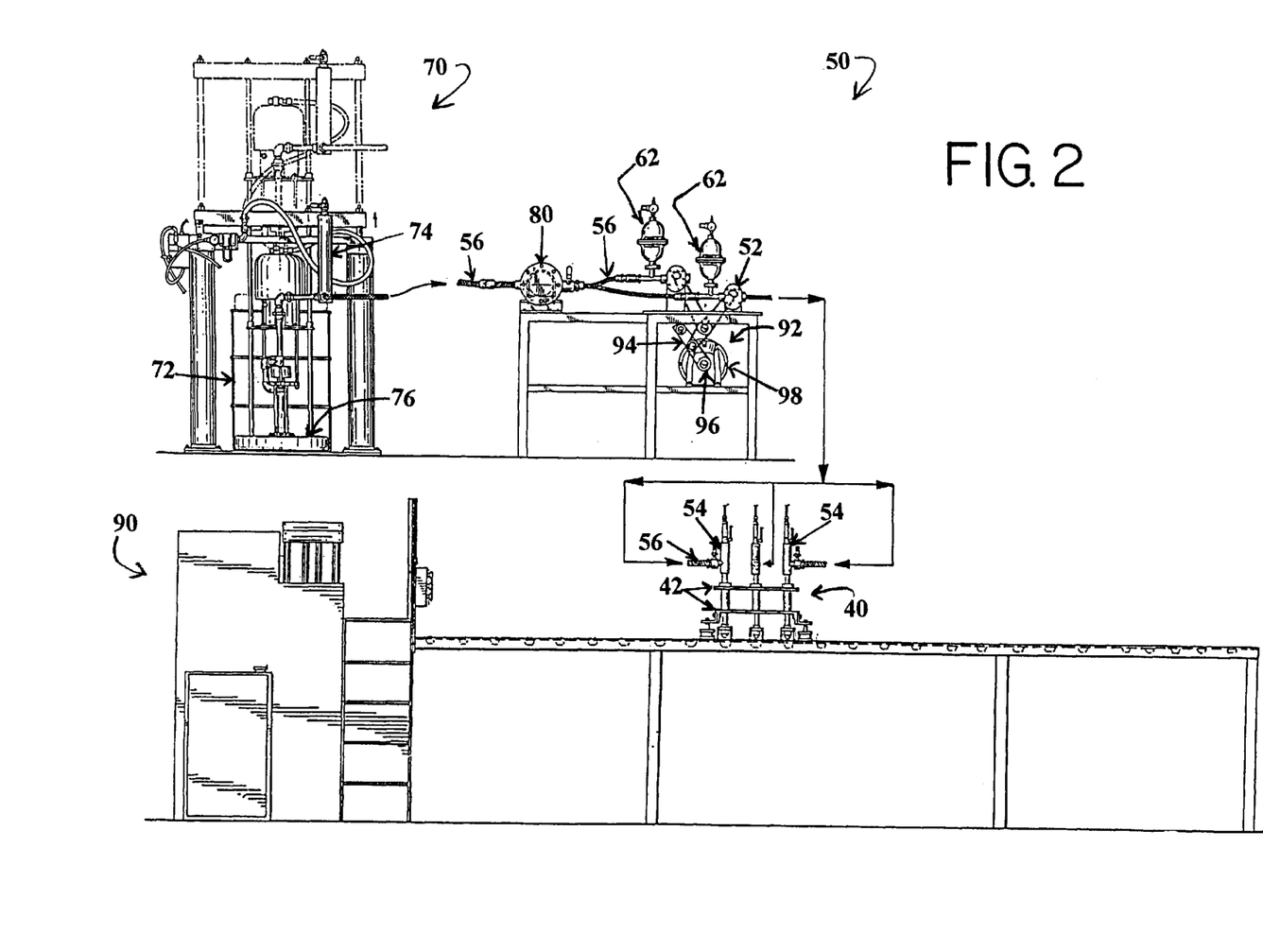
FIG. 2 is a side elevational view of the apparatus for metering and dispensing the shelf-stable cookie dough confection located parallel to the filling station used with the packaging conveyor identified in FIG. 1.
Figures 3, 4:
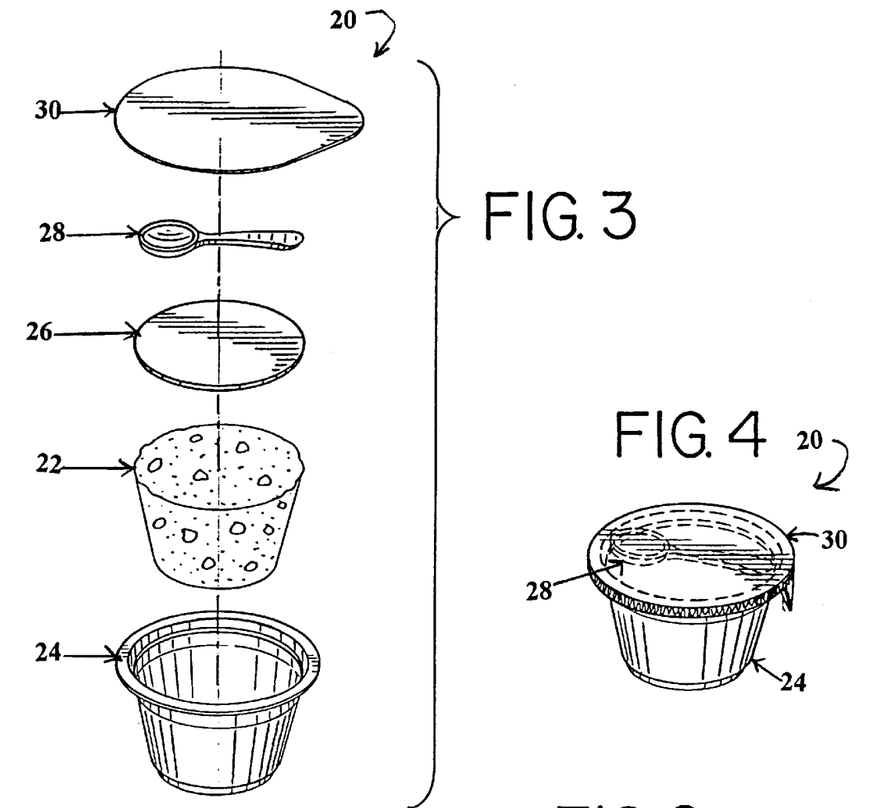
FIG. 3 is an exploded view of a preferred shelf-stable cookie dough confection product produced by the process of FIG. 1.
FIG. 4 is a perspective view of the shelf-stable cookie dough confection product of FIG. 3.

The present invention includes aspects drawn to a shelf-stable cookie dough product 20, as depicted in FIGS. 3 and 4, an apparatus for metering and dispensing a compressible confection 22, as depicted in FIGS. 1, 2, 5, 6, 7, 8, 9 and 10, and a process of packaging the compressible confection 10 as depicted in FIG. 1.

The shelf-stable cookie dough product 20 includes a shelf-stable cookie dough confection 22. The shelf-stable cookie dough confection 22 has a taste and texture of raw cookie dough. The confection can be made using an aerated fat, a food grade glycerine, a food grade starch and sugar.

The taste and texture of the confection is selected from, but not limited to, the group consisting of chocolate chip cookie dough flavor, peanut butter cookie dough flavor, chocolate peanut butter cookie dough flavor, sugar cookie dough flavor, chocolate cream sandwich cookie flavor, cookie and cream flavor, chocolate mint chip flavor and chocolate brownie flavor.

The aerated fat provides a light, fluffy, or doughy, texture to the confection. The aerated fat is selected from the group consisting of, but is not limited to, shortening-type fats. The preferred confection has an aerated fat composition between about 10 and 45 weight percent.

The food grade glycerine provides plasticity to the confection. Preferably, the glycerine has a percent solids level of between about 96 to about 99 percent solids. The preferred composition comprises between about 0.5 and about 10 weight percent of a food grade glycerine having a solids level of about 96 weight percent solids.

The food grade starch acts both as a drying agent and a bulking agent. As a desiccant, starch provides additional moisture protection. As a bulking agent, starch eliminates the need to use flour, a bulking agent used in conventional cookie dough confections. Flour, and the proteins found therein, typically provide a harbor for bacteria. Thus, the use of starch as a bulking agent and the attendant reduced risk of bacterial contamination confers an advantage to the relevant art. The preferred composition comprises between about 5 and about 30 weight percent of a food grade starch.

The sugar is selected from the group consisting of brown sugar, brown sugar powder, granular sugar, powder sugar and mixtures thereof The preferred composition comprises between about 5 and about 45 weight percent sugar. More preferably, the confection comprise between about 5 and about 30 weight percent brown sugar powder, between about 5 and about 30 weight percent granular sugar, and between about 5 and about 30 weight percent powder sugar.

The preferred confection includes a food grade emulsifier. The emulsifier acts as a binding agent and is added in either a dry or a melted form. As a binding agent, the food grade emulsifier brings together the fat portions of the confection with any available moisture and provides stability to the overall confection. More specifically, the food grade emulsifier provides a dough-like texture and prevents the confection from crumbling and falling apart over time. Preferably the food grade emulsifier is selected from a group consisting of mono- and di-glycerides and propylene glycol. Most preferably the food grade emulsifier is MIVATEX 3-50. The preferred composition comprises between about 0.1 and 2 weight percent of a food grade emulsifier.

The preferred confection includes a food grade antioxidant. The antioxidant is added to prevent oxidative rancidity and to improve the shelf life. Typically, a shelf life of about nine to 12 months can be achieved. The antioxidant is added in compliance of governmental regulations as a percentage of the fat. The preferred composition comprises a food grade antioxidant at a level of about 0.02 percent by weight of the fat.

The preferred confection includes corn syrup solids. The preferred composition comprises between about 5 and about 30 weight percent corn syrup solids.

The preferred confection includes a flavoring. The flavoring is selected from, but not limited to, the group consisting of vanilla, almond, peanut butter, chocolate, mint and combinations thereof The preferred composition comprises between about 0.05 and about 3.5 weight percent of a flavoring.

The preferred confection includes a flavored chip. The flavored chip is selected from, but not limited to, the group consisting of chocolate, peanut butter, mint, chocolate cookie, vanilla cookie, mint cookie, and brownie. Preferably, the flavored chips are fat-based. Most preferably, the fat-based flavored chips are coated. The coating prevents the fat-based flavored chips from dissolving in the confection. The preferred composition comprises a flavored chip content of between about 0.1 and about 20 weight percent.

The preferred confection includes a stabilizer such as a cellulose-based gum. The stabilizer is added to create a creamy, doughy texture. Most preferably, the cellulose-based gum comprises hydroxypropyl methylcellulose. The preferred composition comprises between about 0.5 and about 4 weight percent of a cellulose-based gum.

The preferred confection includes a food grade salt. The preferred composition comprises between about 0.1 and 4 weight percent of a food grade salt.

The confection of the present invention is virtually moisture-free. As such, microbial growth is inhibited. The preferred confection has a water activity ($A_w$) level of 0.6 or less.

An example of a cookie dough confection of the preferred invention has a water activity ($A_w$) level of 0.6 or less and comprises about 28 weight percent of an aerated fat, about 1 weight percent of a food grade glycerine, about 0.5 weight percent of a food grade emulsifier, about 0.25 weight percent flavoring, about 0.0056 weight percent of a food grade antioxidant, about 14.75 weight percent of a food grade starch, about 13 weight percent brown sugar powder, about 12.64 weight percent granular sugar, about 10 weight percent corn syrup solids, about 9.0 weight percent powder sugar, about 7.75 weight percent chocolate flavored chips, and about 2 weight percent cellulose-based gum.

FIGS. 3 and 4 illustrate another aspect of the invention. The shelf-stable cookie dough confection product 20 comprises a shelf-stable cookie dough confection 22 in a package, preferably a sanitary package of an individual portion of the confection. The sanitary package provides a barrier to oxygen and moisture and preferably includes a cup 24, a sanitary disk 26, an eating implement 28, and a lid 30.

Most preferably the cup 24 comprises a multi-layer laminate of polystyrene, ethylvinyl alcohol and polyethylene. The eating implement 28 is choke resistant and is preferably a spoon. Most preferably the spoon has a 2½ inch length. The ideal length of 2½ inches makes the spoon small enough to fit within the cup but large enough to avoid the danger of becoming lodged in the throat of a small child. Thus, the incorporation of an eating element 28 within the packaging of the shelf-stable cookie dough confection product 20 represents a unique aspect of the present invention.

The sanitary disk 26 is placed between the shelf-stable cookie dough confection 22 and the eating implement 28. Most preferably the sanitary disk 26 is impervious to fat and comprises a foam material.

The lid 30 preferably comprises a multi-layer laminate of clay-coated paper, foil and a sealant layer. Preferably, the sealant layer (not shown) comprises high density polyethylene, ethyl acrylic acid and surlyn polymer.

FIGS. 2, 5, 6, 7, 8, 9, and 10 depict yet another aspect of the present invention. The apparatus for metering and dispensing a compressible confection 50 comprises at least one metering pump 52, at least one internal bottom shutoff nozzle 54, at least one product line 56 interconnecting the metering pump 52 and the internal bottom shutoff nozzle 54, a diving mechanism 40 for lowering and elevating the internal bottom shutoff nozzle 54, and a control mechanism (not shown) for cyclically operating the metering pump 52 and operating the internal bottom shutoff nozzle 54 and the diving mechanism 40 in synchronization with the metering pump 52. By operating the internal bottom shutoff nozzle 54 in synchronization with the metering pump 52, generally constant pressure is maintained between the metering pump 52 and the internal bottom shutoff nozzle 54. Ultimately, the compression and relaxation phenomenon of the compressible confection is minimized by maintaining a generally constant pressure between the metering pump 52 and the internal bottom shutoff nozzle 54 and a more even flow, or the weight control, of the final product is achieved.

Preferably the apparatus for metering and dispensing the compressible confection 50 includes a displacement drum pump 70 for transporting the compressible confection from a 55 gallon drum 72. The product line 56 interconnects the displacement drum pump 70 and the metering pump 52.

Figure 7:
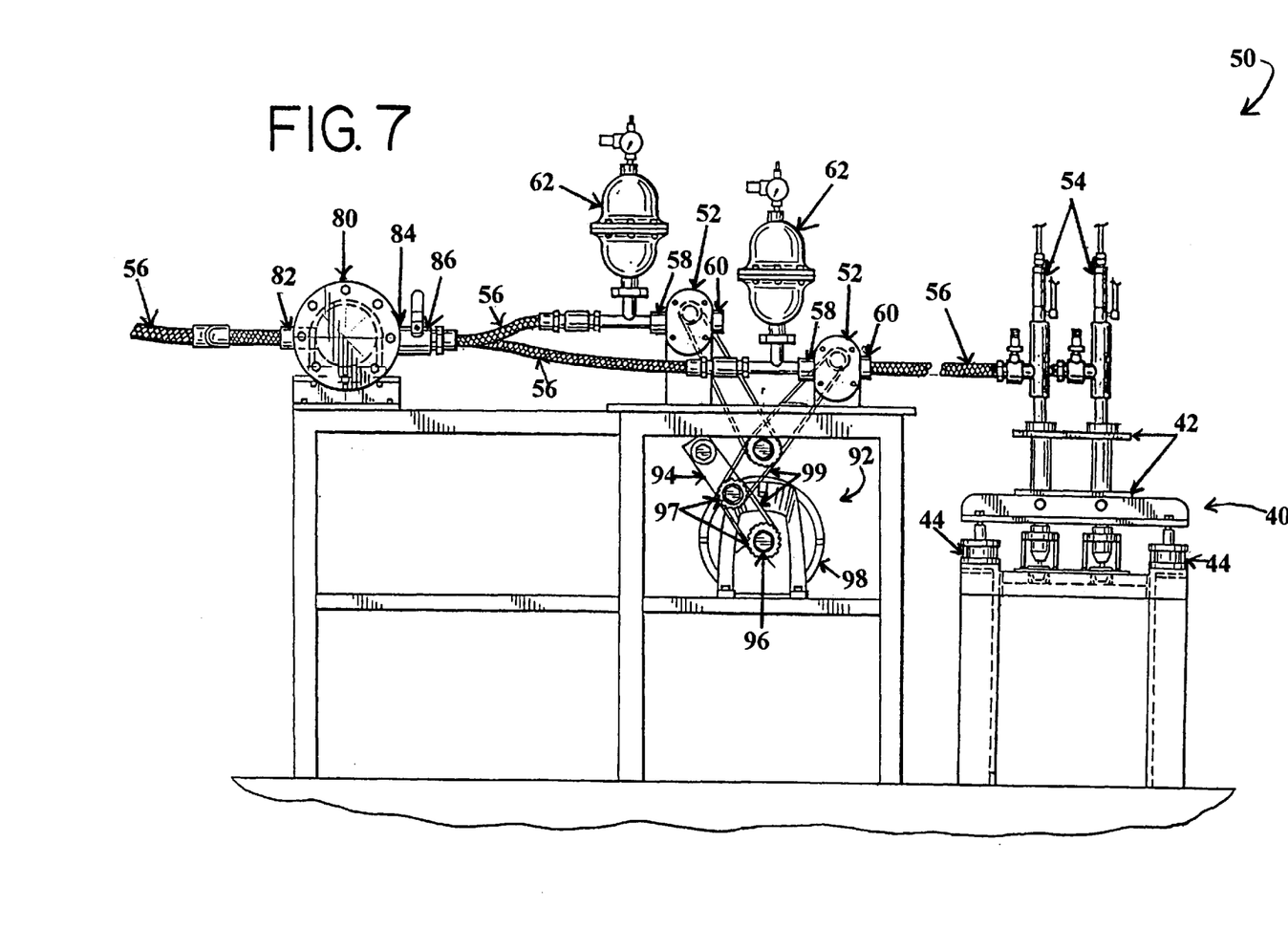
FIG. 7 is a side elevational view of the apparatus for metering and dispensing the shelf-stable cookie dough confection depicted in FIG. 2.
Figure 8:
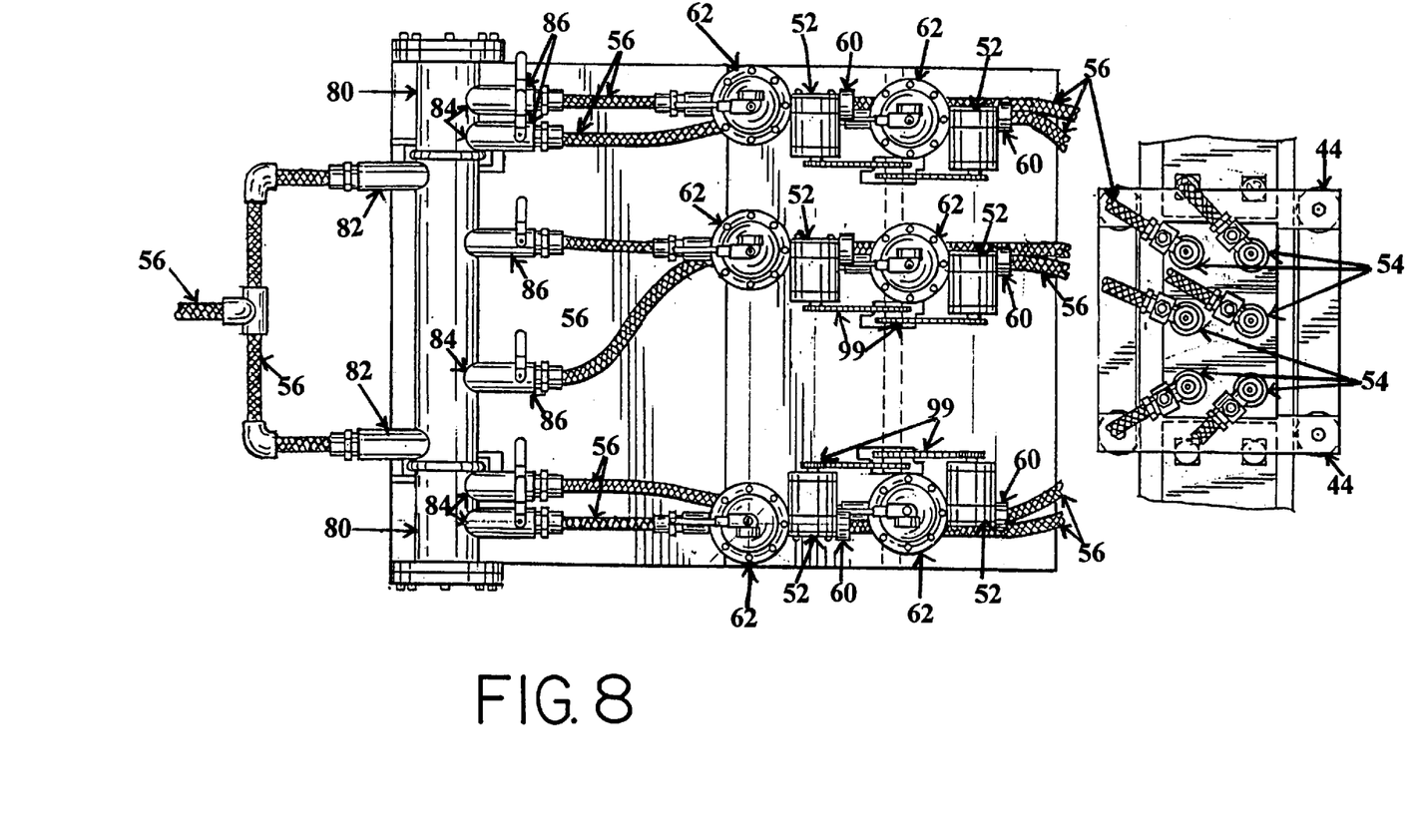
FIG. 8 is a top plan view of the apparatus for metering and dispensing the shelf-stable cookie dough confection of FIG. 7.

Most preferably, the apparatus comprises a manifold 80, multiple metering pumps 52, multiple internal bottom shutoff nozzles 54, a bracket 42 for supporting and spacing the multiple internal bottom shutoff nozzles 54, and multiple product lines 56 interconnecting the multiple metering pumps 52 and the multiple internal bottom shutoff nozzles 54. The manifold 80 interconnects the multiple metering pumps 52 and the displacement drum pump 70.

The metering pumps 52 of the present invention are rotary metering pumps. The rotary metering pumps 52 meter as well as transport the compressible confection to be dispensed. The rotary metering pumps 52 are electrically operated and comprise an intake port 58 and a discharge port 60. Preferably a sanitary pulse regulator 62 is attached to the intake port 58 of each rotary metering pump 52. By protecting against air pockets in the compressible confection, the pulse regulator 62 enhances the metering capability of the pump 52. Generally, the selection of lobe-type positive displacement pumps 52 achieves greater metering precision. Most preferably the lobe-type positive displacement pump is a Tri-Clover® PR3 Series Positive Rotary Pump having an intake and discharge port size of about 1 inch and having a maximum flow rate of about 2.8 GPM at 20 PSI. The PR3 pumps 52 are driven by a motor 98 driving a drive shaft 96 having multiple sprockets 97 thereon and chain drives 99 between the drive shaft sprockets 97 and the PR3 pumps 52.

Figures 9, 9A:
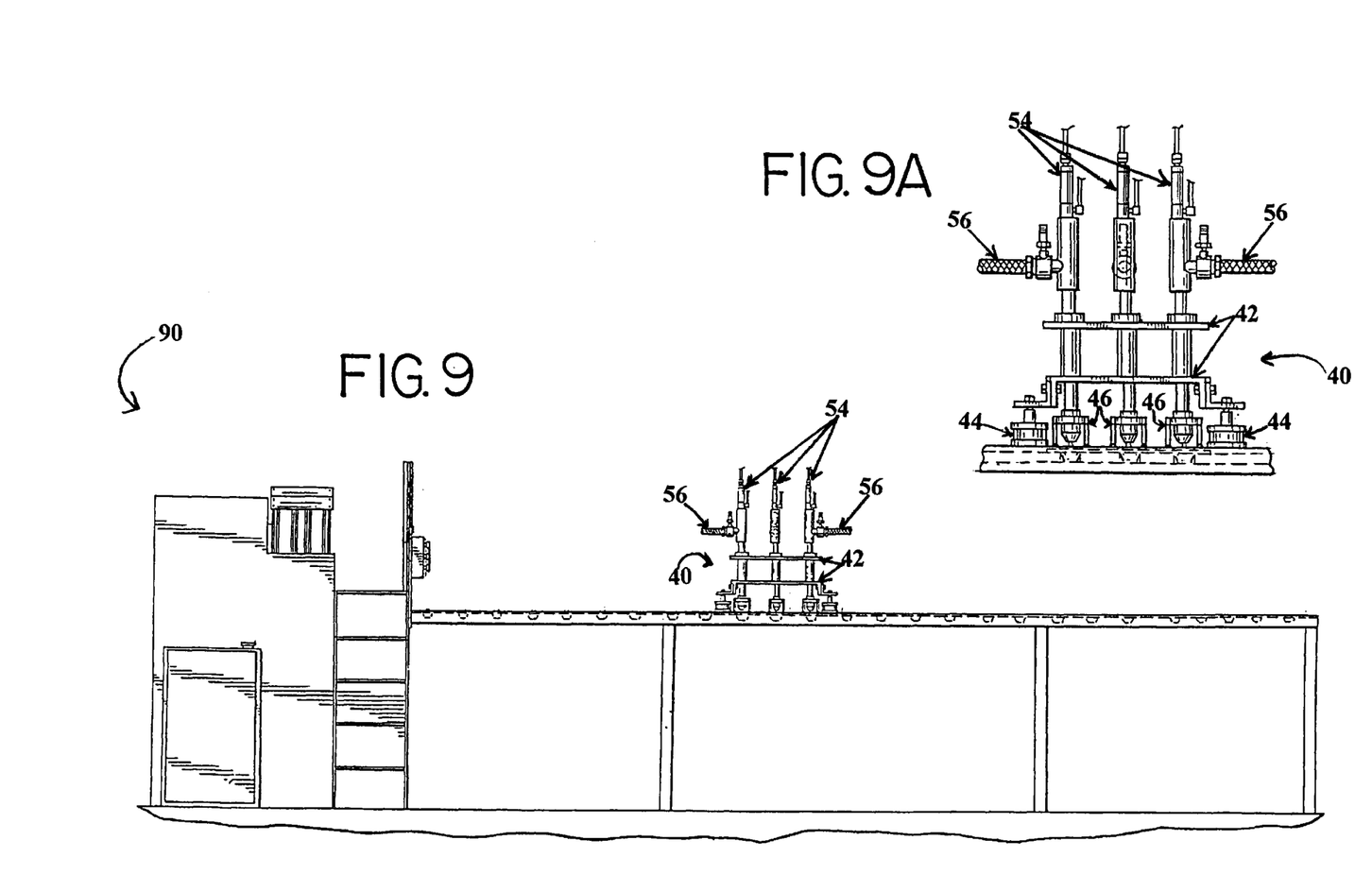
FIG. 9 is a side elevational view of the packaging conveyor depicted in FIG. 2.
FIG. 9A is an enlarged view of the diving mechanism for lowering and elevating the multiple shutoff nozzles shown in FIG. 9.

The internal bottom shutoff nozzle 54 of the present invention are pneumatically operated and controlled by at least one electrical solenoid (not shown). The pneumatically operated internal bottom shutoff nozzles 54 prevent the confection from flowing out of the bottom of the nozzle as the confection relaxes. Most preferably the pneumatically operated internal bottom shutoff nozzles 54 are KALISH brand Kalishtronic Giant Internal Bottom Shutoff Nozzles comprising a nozzle size of about 1½ inches and an outlet having an inner diameter of about 1 inch. The Kalishtronic Giant Internal Bottom Shutoff Nozzles generally deliver a precise amount of the confection. By preference, a nozzle-tip collar 46 is attached to each internal bottom shutoff nozzle 54 for holding a cup 24 in place as the cup 24 is filled with a compressible confection 22. Most preferably, the nozzle-tip collar 46 comprises a collar and at least one spring attached to the collar.

The product line 56 interconnecting the metering pump 52 and the internal bottom shutoff nozzle 54 is sanitary and flexible. Preferably, the product line 56 interconnecting the metering pump 52 and the internal bottom shutoff nozzle 54 comprises 1 inch, stainless steel braided pipe. Also by preference, the apparatus of the present invention comprises an accumulator 74 for surge protection from air pockets in the compressible confection 22. The accumulator 74 is attached to the product line 56 between the displacement drum pump 70 and the manifold 80. Most preferably, the product line 56 interconnecting the displacement drum pump 70 and the manifold 80 comprises 1½ inch, stainless steel braided pipe.

The manifold 80 comprises at least one inlet port 82 and preferably two inlet ports, multiple outlet ports 84 and multiple ball valves 86. Each ball valve 86 is attached to at least one outlet port 84. The output rate of product in finite number of units per minute can be adjusted by opening and closing the ball valves 86 and thereby operating either a single pump, product line, and shutoff nozzle or multiple metering pumps, product lines, and shutoff nozzles. Preferably, the manifold 80 includes a supplemental surge accumulator (not shown) for additional surge protection from air pockets in the compressible confection 22. The supplemental surge accumulator (not shown) is attached at the top of the manifold 80.

Figure 5:
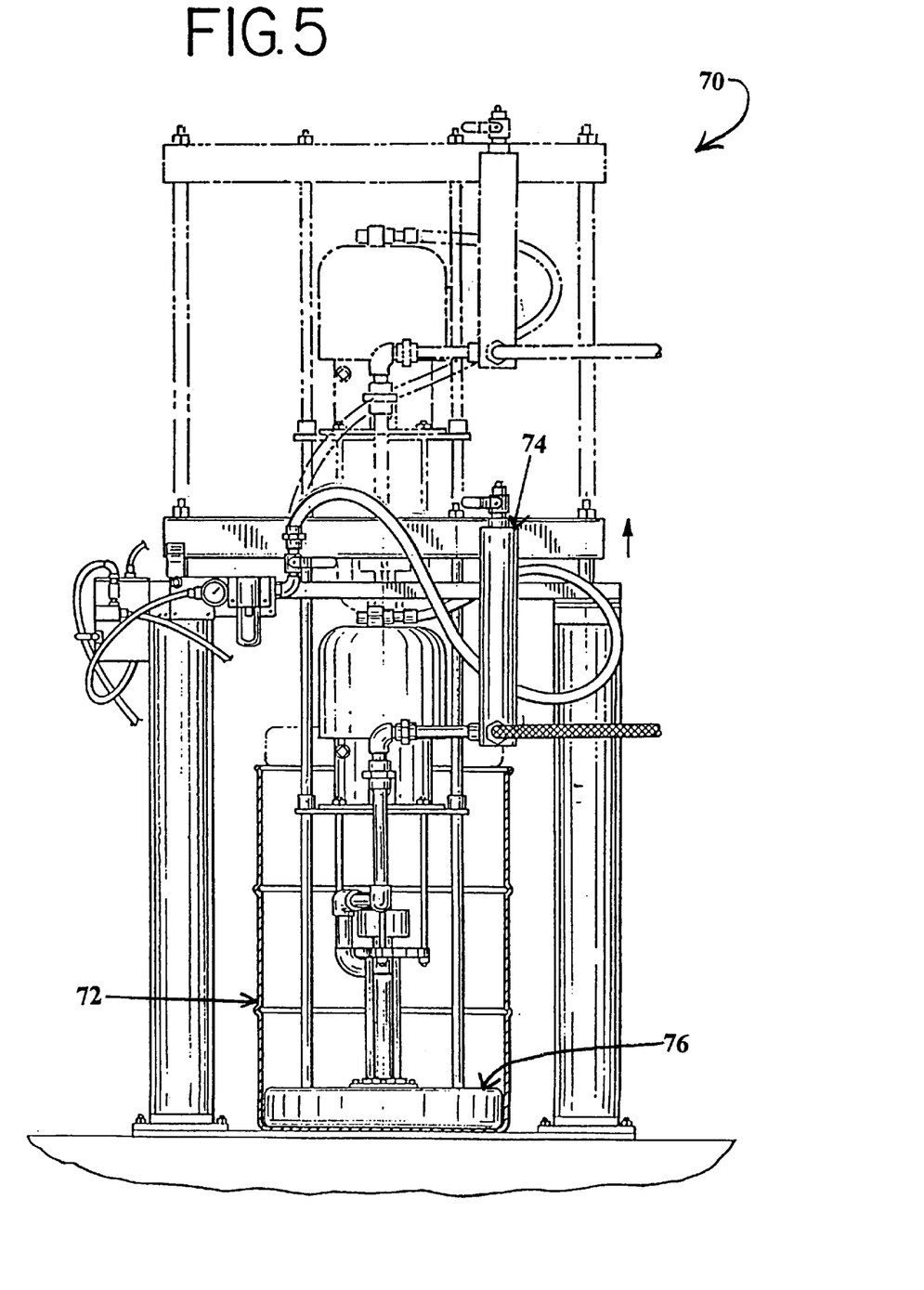
FIG. 5 is a side elevational view of the displacement drum pump depicted in FIG. 2.
Figure 6:
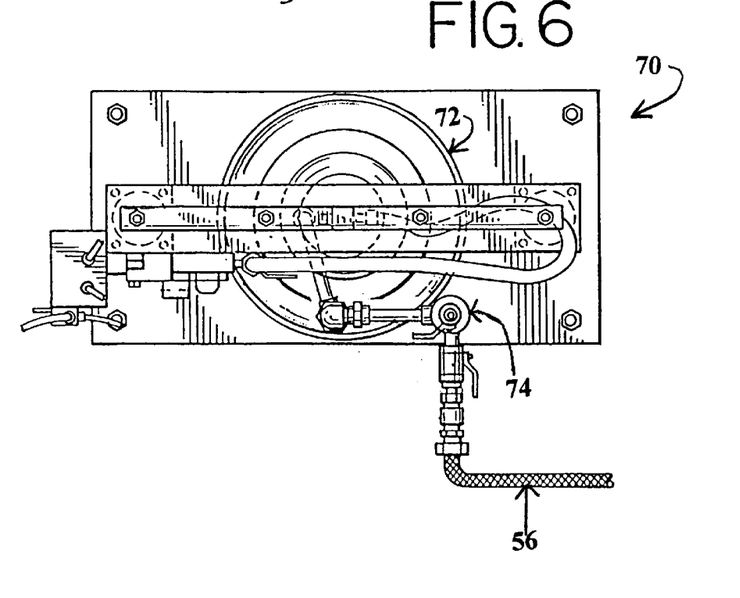
FIG. 6 is a top plan view of the displacement drum pump of FIG. 5.

The displacement drum pump 70 is pneumatically operated, controlled by an electrical solenoid (not shown), and comprises a ram 76 and a relief spout (not shown). Most preferably the pneumatically operated displacement drum pump 70 is a Graco® King Pump with priming piston, Model 207-568 Series D, and comprises a Graco® 55

Gallon Ram, Model 207-279, and a Graco® King Air Motor, Model 207-647 Series L.

The diving mechanism 40 for lowering and elevating the multiple shutoff nozzles 54 comprises at least one pneumatically operated air cylinder 44 controlled by at least one electrical solenoid (not shown). By lowering and elevating the shutoff nozzles 54, the diving mechanism 40 facilitates the dispensing of the compressible confection 22. Preferably the diving mechanism 40 comprises multiple air cylinders 44 controlled by multiple electrical solenoids (not shown) wherein each air cylinder 44 is controlled by a separate electrical solenoid (not shown). Most preferably, the diving mechanism 40 is attached to the bracket 42 for supporting and spacing the internal bottom shutoff nozzles 54.

Preferably the control mechanism (not shown) is capable of cyclically operating the metering pumps 52 and operating the shutoff nozzles 54, the diving mechanism 40 and the displacement drum pump 70 in synchronization with the metering pumps 52. By preference, the control mechanism (not shown) comprises a signal generating device (not shown) controlled by a packaging conveyor 90 and an electrically operated clutch breaking system 92 comprising a clutch break 94 engaging the drive shaft 96. The clutch breaking system 92 accommodates the intermittent operation of the packaging conveyor 90 and enables the motor 98 driving the metering pumps 52 to run continuously.

Most preferably, the control mechanism (not shown) is capable of simultaneously sending a signal to the electrical solenoids controlling the bottom shutoff nozzles 54, air cylinder 44 and displacement drum pump 70, as well as to the clutch breaking system 92. Upon receiving a signal from the packaging conveyor 90, the first electrical solenoids open the internal bottom shutoff nozzles 54, the second electrical solenoids cause the air cylinder 44 to lower the internal bottom shutoff nozzles 54 to a fully lowered position, and the third electrical solenoid starts the displacement drum pump 70. Meanwhile, the clutch break 94 disengages the drive shaft 96 to start the metering pumps. As the metering pumps 52 operate, the diving mechanism 40 gradually elevates the internal bottom shutoff nozzles 54. Similarly, upon receiving a signal from the packaging conveyor 90, the first electrical solenoids close the internal bottom shutoff nozzles 54, the second electrical solenoids cause the air cylinder 44 to elevate the internal bottom shutoff nozzles 54 to a fully elevated position, the third electrical solenoid stops the displacement drum pump 70. Also, the clutch break 94 engages the drive shaft 96 to stop the metering pumps 52.

Figure 10:
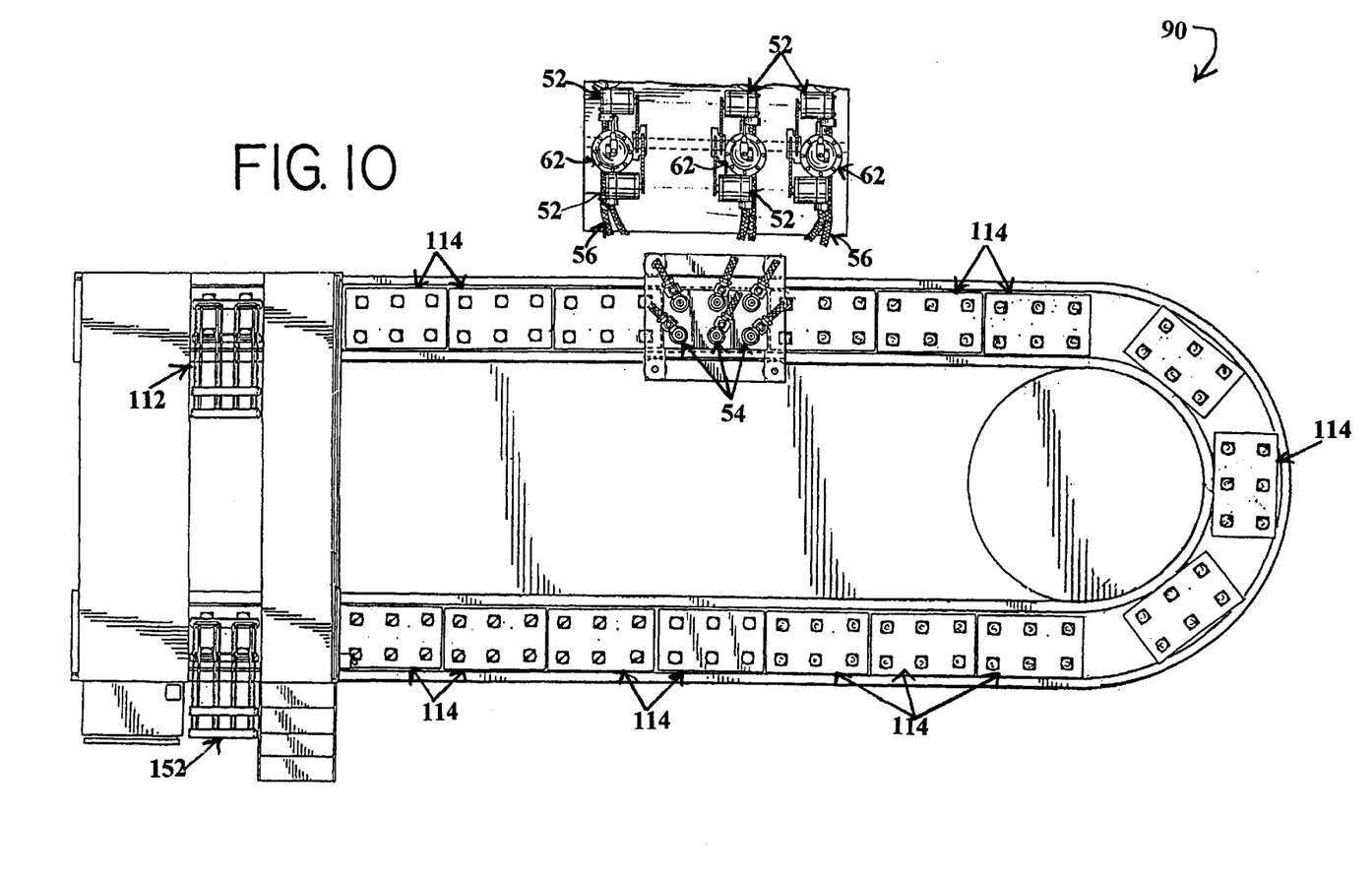
FIG. 10 is a top plan view of the packaging conveyor of FIG. 9.

FIGS. 1, 9 and 10 depict a further aspect of the present invention. The invention is a process for packaging a shelf-stable cookie dough confection comprising the steps of loading an empty cup 24 onto a packaging conveyor 90, conveying the empty cup 24 to a filling station 120, filling the empty cup 24 with the shelf-stable cookie dough confection 22 to form a filled cup, conveying the filled cup to a lid placement station 150, placing a lid 30 on top of the filled cup, conveying the filled cup to a lid sealing station 160, and sealing the lid to the filled cup to form a packaged product 20.

Preferably, the filling is performed using a lobe-type positive displacement pump 52 feeding the confection to an internal bottom shutoff nozzle 54. Also by preference, the process includes the steps of conveying the filled cup to a disk insert station 130 and inserting a disk 26 before the filled cup is conveyed to the lid placement station 150. The disk is tapped to settle the shelf-stable cookie dough confection 22 within the filled cup. By preference a pick and place machine (not shown) is used to insert and tap the disk 26. Next, the filled cup is conveyed to an eating implement placement station 140 and an eating implement 28 is placed in the filled cup. After the lid 30 is sealed to the filled cup, the process includes the steps of conveying the packaged product 20 to a packaged product removal station 170 and removing the packaged product 20 from the packaging conveyor 90.

Most preferably the packaging conveyor 90 of the present invention is an Alloyd brand Blister Pack Machine, Model 18SC1216 Carousel and comprises a cup loading station 100, nesting trays 114, a filling station 120, a disk insert station 130, an spoon placement station 140, a lid placement station 150, a lid sealing station 160, and a packaged product removal station 170.

More specifically, the cup loading station 100 comprises a first magazine 112, or cup feeder magazine, (FIG. 10), an adjustable cup suction assembly (not shown) to pull the cups from the cup feeder magazine 112 and place them on the nesting trays 114. The cup feeder magazine 112 and the adjustable cup suction assembly are mounted on the packaging conveyor 90 at the cup loading station 100.

In the preferred invention the packaging conveyor comprises multiple nesting trays 114. The nesting tray 114 comprises an aperture into which the cup is loaded. Preferably each nesting tray comprises multiple apertures into which multiple cups are loaded. Most preferably the multiple apertures comprise a configuration having two rows of three apertures.

In the preferred invention the filling station 120 comprises the apparatus for metering and dispensing a compressible confection 50. The disk insert station 130 preferably includes a pick and place machine (not shown). Also by preference, a spoon 28 is manually placed in the filled cup at the spoon placement station 140.

In the preferred invention the lid placement station 150 comprises a second magazine 152, or lid feeder magazine, an adjustable lid suction assembly (not shown) to pull the lids from the lid feeder magazine 152 and place them on the filled cups. The lid feeder magazine 152 and the adjustable lid suction assembly are mounted on the packaging conveyor 90 at the lid placement station 150.

In the preferred invention the lid sealing station 160 comprises a heat plate (not shown) and a pressure anvil (not shown) for heat sealing the lid 30 to the filled cup. Preferably, the packaged product removal station 170 comprises an adjustable eject station assembly (not shown) to lift the sealed packages off of the nesting trays 114 and place them onto the discharge chute (not shown) to exit away from the packaging conveyor 90.

In the process of the preferred invention, the packaging conveyor 90 operates intermittently and in synchronization with the apparatus for metering and dispensing a compressible confection 50. Most preferably, the packaging conveyor 90 conveys for about 1 second and stops for about 3 seconds. Meanwhile, the apparatus for metering and dispensing a compressible confection 50 fills at least one empty cup at the cup filling station within about 3 seconds.

It should be appreciated that the compositions, apparatus and methods of the present invention are capable of being incorporated in the form of a variety of embodiments, only a few of which have been illustrated and described above. The invention may be embodied in other forms without departing from it spirit or essential characteristics. It will be appreciated that the addition of some other ingredients, process steps, materials or components not specifically included may have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes that come within the meaning and range of equivalency of the claims are to be embraced within their scope.

What is claimed is:

1. An apparatus for metering and dispensing a compressible confection comprising:
    a) at least one metering pump; the metering pump comprising an intake port and a discharge port;
    b) at least one internal bottom shutoff nozzle;
    c) at least one product line interconnecting the metering pump and the internal bottom shutoff nozzle; and
    d) a control mechanism for cyclically operating the at least one metering pump and operating the at least one internal bottom shutoff nozzle in synchronization with the metering pump such that generally constant pressure is maintained between the metering pump and the internal bottom shutoff nozzle.

2. The apparatus of claim 1 comprising at least one pulse regulator attached to the intake port of the metering pump.

3. The apparatus of claim 1 comprising a diving mechanism for lowering and elevating the at least one internal bottom shutoff nozzle, the control mechanism being capable of operating the diving mechanism in synchronization with the metering pump.

4. The apparatus of claim 1 wherein the internal bottom shutoff nozzle comprises a nozzle tip collar for holding a cup in place as the cup is filled with the compressible confection.

5. The apparatus of claim 4 further comprising a bracket for supporting the at least one internal bottom shutoff nozzle and interconnecting the diving mechanism and the at least one internal bottom shutoff nozzle.

6. The apparatus of claim 1 wherein the control mechanism comprises a clutch breaking system.

7. The apparatus of claim 1 wherein the metering pump comprises a lobe-type positive displacement pump.

8. An apparatus for metering and dispensing a compressible confection comprising:
    a) a pneumatically operated displacement drum pump which comprises a ram and a relief spout and is controlled by a third electrical solenoid;
    b) a manifold which comprises:
        i) at least one inlet port,
        ii) multiple outlet ports,
        iii) multiple ball valves wherein each ball valve is attached to at least one outlet port, and
        iv) a supplemental surge accumulator for additional surge protection from air pockets in the compressible confection;
    c) a product line connected at one end to the displacement drum pump and at the other end to the at least one manifold inlet port;
    d) an accumulator attached to the product line between the displacement drum pump and the manifold;
    e) multiple lobe-type positive displacement pumps each comprising an intake port and a discharge port, the pumps being driven by a motor driving a drive shaft having multiple sprockets thereon and chain drives between the drive shaft sprockets and the pumps;
    f) multiple sanitary pulse regulators wherein each sanitary pulse regulator is attached to the intake port of at least one lobe-type positive displacement pump;
    g) multiple first flex-lines wherein each first flex-line is connected at one end to one of said ball valves and at the other end to one of said pump intake ports;
    h) multiple pneumatically operated internal bottom shutoff nozzles;
    i) multiple nozzle-tip collars wherein each nozzle-tip collar comprises a collar and at least one spring mounted to the collar for holding a cup in place as the cup is filled with the compressible confection, the nozzle tip collar being attached to the pneumatically operated internal bottom shutoff nozzle;
    j) multiple first electrical solenoids wherein each first electrical solenoid controls at least one pneumatically operated internal bottom shutoff nozzle;
    k) a bracket for supporting and spacing the multiple pneumatically operated internal bottom shutoff nozzles;
    l) a diving mechanism for lowering and elevating the multiple internal bottom shutoff nozzles comprising at least one pneumatically operated air cylinder controlled by at least one second electrical solenoid and is attached beneath the bracket;
    m) multiple second flex-lines wherein each second flex-line is connected at one end to one of said pump discharge ports and at the other end to one of said internal bottom shutoff nozzles; and
    n) a control mechanism for synchronously operating the displacement drum pump, the multiple lobe-type positive displacement pumps and the multiple internal bottom shutoff nozzles such that generally constant pressure is maintained between each multiple lobe-type positive displacement pump and shutoff nozzle, the control mechanism also being capable of operating the diving mechanism in synchronization with they rotary metering pump.

9. The apparatus of claim 8 wherein the control mechanism comprises:
    a) a signal generating device controlled by a packaging conveyor; and
    b) an electrically operated clutch breaking system comprising a clutch break engaging the drive shaft.

10. The apparatus of claim 9 wherein the control mechanism is capable of simultaneously sending a signal to the first electrical solenoids, the second electrical solenoids, the third electrical solenoid and the clutch breaking system.

11. The apparatus of claim 10 wherein the first electrical solenoid is capable of receiving the signal and opening the internal bottom shutoff nozzle.

12. The apparatus of claim 11 wherein the second electrical solenoid is capable of receiving the signal and lowering the at least one internal bottom shutoff nozzle to a fully lowered position.

13. The apparatus of claim 12 wherein third electrical solenoid is capable of receiving the signal and starting the pneumatically operated displacement drum pump.

14. The apparatus of claim 13 wherein the clutch breaking system is capable of receiving the signal and starting the rotary metering pump.

15. The apparatus of claim 14 wherein the clutch break is capable of disengaging the drive shaft to start the rotary metering pump.

16. The apparatus of claim 15 wherein the diving mechanism is capable of gradually elevating the at least one internal bottom shutoff nozzle as the rotary metering pump operates.

17. The apparatus of claim 10 wherein the first electrical solenoid is capable of receiving the signal and closing the internal bottom shutoff nozzle.

18. The apparatus of claim 17 wherein the second electrical solenoid is capable of receiving the signal and elevating the internal bottom shutoff nozzle to a fully upright position.

19. The apparatus of claim 18 wherein the third electrical solenoid is capable of receiving the signal and stopping the pneumatically operated displacement drum pump.

20. The apparatus of claim 19 wherein the clutch breaking system is capable of receiving the signal and stopping the rotary metering pump.

21. The apparatus of claim 20 wherein the clutch break is capable of engaging the drive shaft to stop the rotary metering pump.

22. An apparatus for metering and dispensing a compressible confection comprising:
   a) at least one electrically operated rotary metering pump comprising:
      i) an intake port,
      ii) a discharge port, and
      iii) a chain drive;
   b) at least one pneumatically operated internal bottom shutoff nozzle controlled by at least one first electrical solenoid and supported by a bracket;
   c) at least one nozzle tip collar comprising a collar and at least one spring for holding a cup in place as the cup is filled with the compressible confection dispensed from the internal bottom shutoff nozzle;
   d) a diving mechanism comprising at least one pneumatically operated air cylinder controlled by at least one second electrical solenoid and attached to the bracket for lowering and elevating the at least one pneumatically operated internal bottom shutoff nozzle;
   e) a product line interconnecting the electrically operated rotary metering pump and the pneumatically operated internal bottom shutoff nozzle;
   f) a control mechanism for cyclically operating the at least one electrically operated rotary metering pump and operating the at least one pneumatically operated internal bottom shutoff nozzle in synchronization with the rotary metering pump such that constant pressure is maintained between the electrically operated rotary metering pump and the pneumatically operated internal bottom shutoff nozzle, the control mechanism being capable of operating the diving mechanism in synchronization with the electrically operated rotary metering pump;
   g) a drive shaft comprising at least one sprocket engaging the chain drive of the electrically operated rotary metering pump; and
   h) a motor driving the drive shaft.

23. The apparatus of claim 22 wherein the control mechanism comprises;
   a) a signal generating device controlled by a packaging conveyor; and
   b) an electrically operated clutch breaking system comprising a clutch break engaging the drive shaft.

24. The apparatus of claim 22 wherein the control mechanism is capable of simultaneously sending a signal to at least one first electrical solenoid, at least one second electrical solenoid and the clutch breaking system.

25. The apparatus of claim 24 wherein the first electrical solenoid is capable of receiving the signal and opening the internal bottom shutoff nozzle and the second electrical solenoid is capable of receiving the signal and lowering the at least one internal bottom shutoff nozzle to a fully lowered position.

26. The apparatus of claim 25 wherein the first electrical solenoid is capable of receiving the signal and closing the internal bottom shutoff nozzle and the second electrical solenoid is capable of receiving the signal and elevating the internal bottom shutoff nozzle to a fully upright position.

27. The apparatus of claim 25 wherein the clutch breaking system is capable of receiving the signal and stopping the rotary metering pump.

28. The apparatus of claim 27 wherein the clutch break is capable of engaging the drive shaft to stop the rotary metering pump.

29. The apparatus of claim 24 wherein the clutch breaking system is capable of receiving the signal and starting the rotary metering pump.

30. The apparatus of claim 29 wherein the clutch break is capable of disengaging the drive shaft to start the rotary metering pump and the diving mechanism is capable of gradually elevating the at least one internal bottom shutoff nozzle as the rotary metering pump operates.

* * * * *

UNITED STATES PATENT AND TRADEMARK OFFICE
CERTIFICATE OF CORRECTION

PATENT NO. : 6,193,105 B1　　　　　　　　　　　　　　　　　　　　　　Page 1 of 1
DATED : February 27, 2001
INVENTOR(S) : Ronald L. Ream et al.

It is certified that error appears in the above-identified patent and that said Letters Patent is hereby corrected as shown below:

Column 10,
Line 36, after "with" delete "they" and substitute -- the -- in its place.

Signed and Sealed this

Twenty-eighth Day of May, 2002

Attest:

Attesting Officer

JAMES E. ROGAN
Director of the United States Patent and Trademark Office